United States Patent [19]

Hiraoka et al.

[11] Patent Number: 5,776,575
[45] Date of Patent: Jul. 7, 1998

[54] INFORMATION RECORDING MEDIUM AND PROCESS FOR PRODUCTION THEREOF

[75] Inventors: Mizuho Hiraoka, Kawasaki; Hiroyuki Imataki, Yokohama, both of Japan

[73] Assignee: Canon Kabushiki Kaisha, Tokyo, Japan

[21] Appl. No.: 419,234

[22] Filed: Apr. 10, 1995

[30] Foreign Application Priority Data

| Apr. 27, 1994 | [JP] | Japan | 6-110119 |
| Apr. 27, 1994 | [JP] | Japan | 6-110120 |
| Apr. 27, 1994 | [JP] | Japan | 6-1100118 |

[51] Int. Cl.$^6$ ........................ B32B 3/00
[52] U.S. Cl. ............ 428/64.1; 428/64.2; 428/64.4; 428/65.2; 428/913; 430/270.1; 430/495.6; 430/945; 369/283
[58] Field of Search .................. 428/64.1, 64.2, 428/64.4, 64.5, 64.6, 64.7, 64.8, 65.2, 913; 430/270.1, 270.11, 495.1, 945; 369/283, 288

[56] References Cited

U.S. PATENT DOCUMENTS

| 4,876,042 | 10/1989 | Imataki et al. | 264/39 |
| 4,925,733 | 5/1990 | Imataki et al. | 428/336 |
| 4,956,214 | 9/1990 | Imataki et al. | 428/64 |
| 4,965,153 | 10/1990 | Imataki et al. | 430/11 |
| 5,026,623 | 6/1991 | Imataki et al. | 430/270 |
| 5,073,101 | 12/1991 | Imataki et al. | 425/385 |
| 5,085,925 | 2/1992 | Hiraoki et al. | 428/215 |
| 5,158,859 | 10/1992 | Imatake et al. | 430/271 |
| 5,173,391 | 12/1992 | Hiraoko et al. | 430/200 |
| 5,216,665 | 6/1993 | Imataki | 369/279 |
| 5,248,584 | 9/1993 | Miura et al. | 430/270 |
| 5,249,176 | 9/1993 | Imataki | 369/283 |
| 5,292,616 | 3/1994 | Fujita et al. | 430/271 |
| 5,297,132 | 3/1994 | Takano et al. | 369/286 |

FOREIGN PATENT DOCUMENTS

| 2-30595 | 1/1990 | Japan . |
| 5-143966 | 6/1993 | Japan . |
| 5-301459 | 11/1993 | Japan . |
| 6-106869 | 4/1994 | Japan . |

Primary Examiner—Patrick Ryan
Assistant Examiner—Elizabeth Evans
Attorney, Agent, or Firm—Fiztpatrick, Cella, Harper & Scinto

[57] ABSTRACT

An information recording medium including a substrate, a recording layer, a protective layer, a print layer on the protective layer, and a barrier layer located intermediate the print layer and the recording layer.

70 Claims, 6 Drawing Sheets

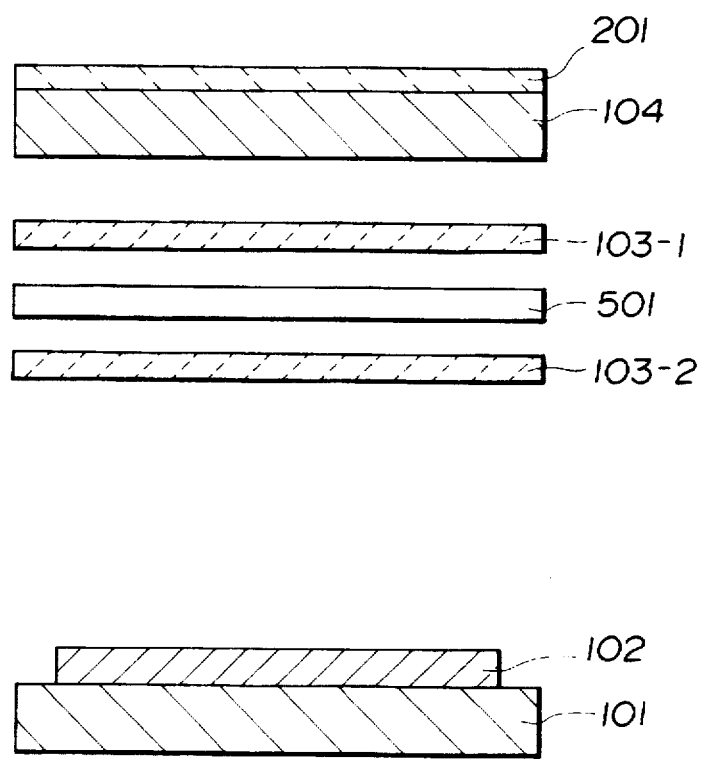

INFORMATION RECORDING MEDIUM AND PROCESS FOR PRODUCTION THEREOF

BACKGROUND OF THE INVENTION

1. Field of the Invention

The present invention relates to an information recording medium and a process for producing the same.

2. Description of the Prior Art

Hitherto, as information recording media there have been known magnetic recording media capable of recording and/or reproducing information magnetically, and optical recording media capable of recording and/or reproducing information with a light beam.

Four examples of known optical recording media are shown schematically in FIGS. 1 to 4.

Referring firstly to FIG. 1, this figure shows an optical recording medium comprising a substrate 101, a recording layer 102, an adhesive layer 103 and a protective substrate 104 laminated together as shown in the Figure.

In recent years, it has been proposed that information, for example, visible information such as a name of the medium's distributor, or the name of the system, are carried by the recording medium. In particular, for media which are carried by individuals, such as optical cards, it is desirable for information about the individual, such as a name of the individual carrying the medium and/or a photograph of the face of the individual to be carried by the medium.

To cope with this requirement, an information recording medium having a print layer has been proposed, examples of which are shown in Japanese Laid-Open Patent Applications JP-A-64-16696 and JP-A-2-30595 and are shown in FIGS. 2 and 3 respectively.

Referring to FIGS. 2 and 3, as in FIG. 1, 101 is a substrate, 102 is a recording layer, 103 is an adhesive layer and 104 is a protective substrate, these being laminated as shown in FIGS. 2 and 3. In addition, a print layer 201 carrying printed information is provided on the protective substrate 104.

However, there is a problem in the long term reliability of information recording media having a print layer.

In order to improve the long term reliability of information recording media, a information recording medium having a protective layer which covers the recording layer 102 has been known, for example, in Japanese Laid-Open Patent Application JP-A-62-290585. Such an information recording medium is shown in FIG. 4. In FIG. 4, the protective layer 401 is made of inorganic or organic material, such as metal, dielectric substance, thermosetting resin, etc.

Such an arrangement suffers the disadvantage, however, that where an inorganic material is used as the protective layer, it is necessary to use complicated processes to form the protective layer, such as vacuum evaporation, sputtering etc., thus increasing the cost of making the information recording medium.

Furthermore, the internal stress of the inorganic protective layer may cause the information recording medium to bend.

On the other hand, where an organic material is used as the protective layer, it is difficult to prevent the print layer from being affected. In particular, for example; in an information recording medium in the form of an optical card, whose thickness is regulated to be from 0.7 mm to 0.8 mm, it is difficult to provide a thick protective layer on the recording layer. Thus, the protective layer is not sufficient to prevent the print layer from affecting the long term reliability of the card.

SUMMARY OF THE INVENTION

In view of the above problems, an object of the present invention is to provide an information recording medium in which the print layer can be prevented from affecting the medium.

Another object of the present invention is to provide a process for producing an information recording medium in which the print layer can be effectively protected at lower cost than has previously been possible.

According to a first aspect of the present invention, there is provided an information recording medium comprising a recording layer and a protective layer, and a print layer provided on the protective layer, wherein a barrier layer is provided between the print layer and the recording layer.

According to another aspect of the present invention, there is provided a process for producing an information recording medium comprising a recording layer and a protective layer, and also comprising a print layer on the protective layer, the process comprising:

providing a recording layer;

providing the protective layer;

disposing the protective layer opposing the recording layer;

disposing a barrier layer between the print layer and the recording layer;

bonding the substrate and the protective layer; and forming the print layer.

BRIEF DESCRIPTION OF THE DRAWINGS

These and other objects, features and advantages of the present invention will become more apparent upon a consideration of the following description of a number of embodiments of the present invention which will be described by way of example only with reference to the accompanying drawings in which:

FIG. 6 is a schematic view for illustrating an embodiment of a process for producing the information recording medium shown in FIG. 5;

DESCRIPTION OF THE PREFERRED EMBODIMENTS

First Embodiment

Figure 1:
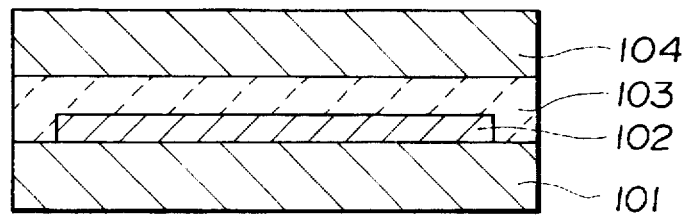
FIGS. 1, 2, 3 and 4 are schematic views of prior optical recording media as have already been described.
Figure 2:
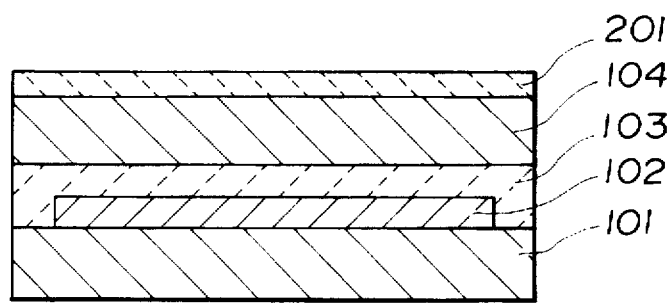
Figure 3:
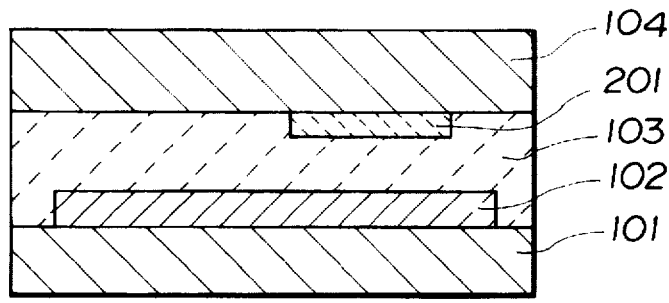
Figure 4:
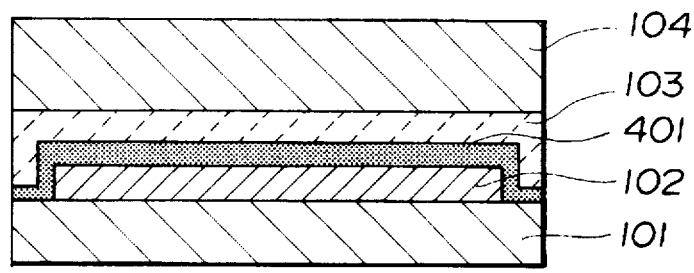
Figure 5:
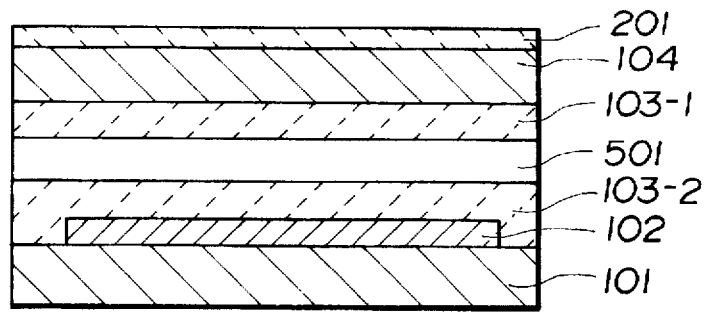
FIG. 5 is a schematic sectional view of an optical card according to a first embodiment of the present invention.

Referring firstly to FIG. 5, 101 is a substrate, 102 is an optical recording layer, 103-1 and 103-2 are adhesive layers, 104 is a protective substrate, 201 is a print layer and 501 is a barrier layer.

The barrier layer 501 is provided between the print layer 201 and the recording layer 102 so as to prevent the recording layer from deteriorating due to the influence of the print layer 201.

The inventors have found that the influence of the print layer on the recording layer depends on the solvent permeability of the laminated layers between the print layer and the recording layer, these layers consisting of the protective layer, the adhesive layer and the barrier layer. Thus, in this embodiment, it is necessary to minimize the solvent permeability of the laminated layers to solvents which are usually used in printing step, such as cyclohexanon, toluene, butyl acetate, methyl acetate, emthoxyethanol, isophoron, etc.

For example, the permeability of these solvents may preferably be $5 \times 10^{-12}$ [cm$^3$(STP)·cm]/[cm$^2$·s·cmHg] or less, and more preferably, $1 \times 10^{-12}$ [cm$^3$(STP)·cm]/[cm$^2$·s·cmHg] or less.

The barrier layer which can be used, such that the laminated layers can achieve this permeability, is not limited to a specific material.

However, in case of the card like information recording medium which is made for carrying individually, the total thickness of the medium has been standardized to be 0.7 to 0.8 mm. Thus the thickness of the laminated layers must be about from 0.3 to 0.4 mm taking into account the thickness of the substrate.

Therefore, in this embodiment, a material which can achieve the permeability of the laminated layers described above whilst having a thickness from 0.1 to 200 µm, particularly from 1 to 100 µm, may be used as the barrier layer.

An example of a suitable material is a laminated resin film. Examples of suitable laminated resin films include a resin film which consists of 2 or more resin layers made of light curable resin, thermosetting resin or thermoplastic resin etc.

The permeability of the barrier layer will depend on the solvents used in the printing step.

The solvent which is used in the printing step is usually a mixed solvent comprising two or more kinds of solvent.

The barrier layer is therefore preferably formed by laminating resins each of which has low permeability to each kind of solvent in the mixed solvent.

Examples for such a resin having low permeability to solvents which is used to being used in the printing process include urethaneacrylate resin, polyamide, nylon, polyethylene, polyvinylidene chloride, fluoro resin etc.

For example, where a mixed solvent containing xylene is used for the printing step, a laminated resin film comprising ethylene-nylon-ethylene having about from 20 to 30 µm of total thickness is preferably used.

In the case where a 0.25 mm-thick acrylic resin substrate is used as the protective substrate, a 30 µm-thick ethylene-acrylic acid type hot-melt adhesive sheet is used for each of the adhesive layers, a 30 µm-thick resin film in the form of ethylene-nylon-ethylene is used as the barrier layer, and the permeability of the laminated layers is $4 \times 10^{-12}$ [cm$^3$(STP) ·cm]/ [cm$^2$·s·cmHg] or less, the stability of the optical card having a print layer is found to be highly improved.

The substrate and the protective substrate are not limited to specific materials as long as the substrates have the requisite strengths for an optical card. For optical or magneto-optical cards, the substrate which transmits the recording and/or reproducing light beam should be a transparent and low optical strain substrate.

Examples of materials for the substrate and the protective substrate include acrylic resin, such as polymethylmethacrylate etc., polyester type resin, polycarbonate resin, such as bisphenol A type polycarbonate, vinyl type resin, polysulphone type resin, polyamide resin, polyacetal resin, polyolefin type resin, such as polymethylpentene etc., polyamide resin and cellulose derivatives.

As the recording layer, there may be used a layer on which information can be recorded as an optically detectable mark by irradiating with the layer a recording light beam. For example, the recording light beam may produce deformation of the layer, or a change of the optical characteristics of the optical recording layer such as decolorization or phase change.

The recording layer may include known optical recordable materials, for example, low-melting point metals such as Te, Bi, Sn, Sb, In etc., alloys of these metals, inorganic thin layers in which phase changes occur such as Te-type alloy, organic coloring matter such as cyanin type, squarilium type, phthalocynaine type, polymethine type, naphthoquinone type, azulene type, azo type etc., organic metal complexes such as benzene dithiol nickel complex etc., and amorphous magnetic recording materials containing rare earth and transition metal elements for use as magnetooptic recording materials such as TbFeCo, GdFeCo etc.

As organic coloring matter tends to be inherently deteriorated by solvent, where organic coloring matter is used as a recording layer, this particular embodiment is particularly advantageous.

For the adhesive for the adhesive layer 103, a vast range of materials can be used provided that the adhesive does not cause the optical recording layer 102 to deteriorate, and does not cause the permeability of the laminated layers between the print layer 201 and the recording layer 102 to increase.

For example, it is possible to use a polymer and/or copolymer of a vinyl monomer, such as a vinyl acetate, a vinyl chloride, an ethylene, an acrylic acid, an acrylic ester and acrylic amid etc., and thermoplastic type adhesive such as polyamide, polyester and polyether, and thermosetting resin type vinyl resin, and a rubber type adhesive such as material rubber, nitrile rubber, chloroprenerubber, silicone rubber.

In particular, rubber type adhesive may preferably be used so as to decrease the permeability.

Furthermore, hot-melt type adhesive such as ethylene-vinyl acetate copolymer, ethylene-acrylic acid copolymer etc. is preferably used because the barrier layer can be provided and easily fixed between the print layer 201 and the recording layer 102.

In addition, where the barrier layer 501 is formed directly on the recording layer 102, the protective substrate 201 can be bonded to the substrate 101 by applying a solvent type adhesive on the barrier layer 501 formed on the recording layer 102.

The print layer 201 may be made of ink which is usually used in known printing process such as screen printing process, offset printing process etc. and preferably has good durability against light.

Examples of materials for the ink include ACRYDIC (trade mark; manufactured by DAINIPPON INK & CHEMICALS INC.) comprising acrylic resin, acryl polyol and at least two solvents selected from toluen, buthanol, ethyl acetate, methyl ethyl keton, methyl cellosolve, xylene, isobuthyl acetate and heptane, BURNOCK (trade mark; manufactured by DAINIPPON INK & CHEMICALS INC.)

comprising polyisocyanate, polyester polyol, alkyd polyol, blockisocyanate and at least two solvents selected from ethyl acetate, buthyl acetate, toluen, xylene, cellosolve acetate, UNIDIC (trade mark; manufactured by DAINIPPON INK & CHEMICALS INC.) comprising ultraviolet cuable resin, urethane acrylate, unsaturated polyester, epoxy acrylate and at least two solvent selected from ethyl acetate, buthyl acetate, xylene.

In addition, in this embodiment, a fixing layer (not shown in FIG. 5) may be provided between the protective substrate and the print layer in order to improve the fixing of the print layer 201 to the protective substrate 104. Examples of the fixing layer include acrylic resin, acryl polyol, polyisocyanate, polyester polyol, alkyd polyol, block polyisocyanate, ultraviolet curable resin etc.

A process for producing the optical card described in FIG. 5 will now be explained with reference to FIG. 6.

Firstly, the substrate 101 is provided with the optical recording layer 102, and the protective substrate 104 is provided with the print layer 201.

Next the protective substrate 104 is disposed relative to the substrate 101 so that the surface of the protective substrate 104 which does not carry the print layer 201 opposes the recording layer 102. A hot-melt adhesive sheet constituting the first adhesive layer 103-1, a barrier layer 501 and a hot-melt adhesive sheet constituting the second adhesive layer 103-2 are disposed between the recording layer 102 and the protective substrate 104.

Finally, the protective substrate 104 is bonded to the substrate 101 by the adhesive layers 103-1 and 103-2, the barrier layer 501 being interposed between the adhesive layers 103-1, 103-2 using a hot pressing method. Thus an optical card is formed having a barrier layer 501 between the print layer 201 and the recording layer 102.

The hot pressing method may be a method using a pair of heated rolls (not shown).

In an adaptation of the process described in relation to FIG. 6, the print layer 201 may be provided on the surface of the protective substrate 104 after the bonding of the protective substrate 104 to the substrate 101.

In addition, the first adhesive layer 103-1 may be formed on the surface of the protective substrate 104 which does not carry the print layer 201 prior to the bonding step. The second adhesive layer 103-2 may be formed on the recording layer 102 and substrate 101 prior to the bonding step.

Further, the barrier layer 501 may be attached to the second surface of the protective substrate by the first adhesive layer, or attached to the recording layer by the second adhesive layer 103-2.

Furthermore, a laminated structure comprising the first adhesive layer 103-1, the barrier layer 501 and the second adhesive layer 103-2 can be formed on the second surface of the protective substrate 104 or on the recording layer 102 prior to the bonding step.

Second Embodiment

Figure 7A:
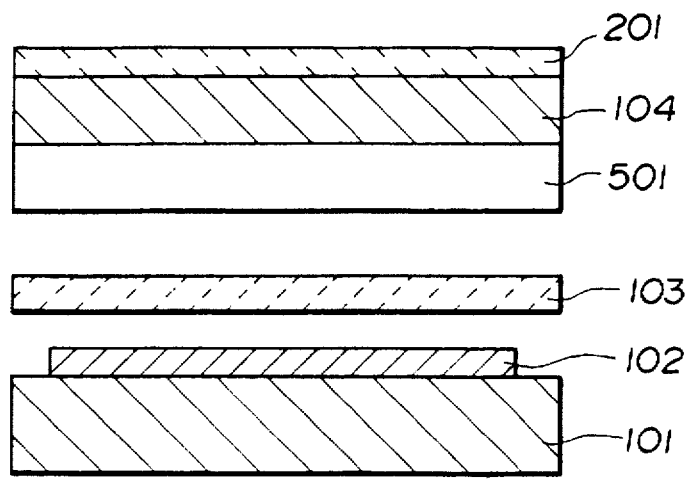
FIGS. 7(a) and 7(b) are schematic sectional views for illustrating another process for producing a information recording medium according to a second embodiment of the present invention.
Figure 7B:
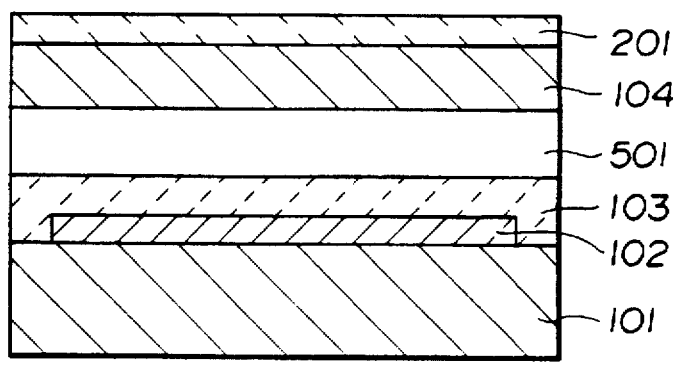

FIGS. 7(a) and 7(b) illustrate a process for producing an information recording medium in accordance with a second embodiment of the present invention.

Referring to FIGS. 7(a) and 7(b), the barrier layer 501 is attached to the surface of the protective substrate 104 which does not carry the print layer 201 by a hot pressing process prior to the bonding step. The protective substrate 104 is bonded to the substrate 101 carrying the recording layer 102 by an adhesive layer 103. In this embodiment, the adhesive layer 103 may be formed on the recording layer 102 prior to the bonding step.

Third Embodiment

Figure 8:
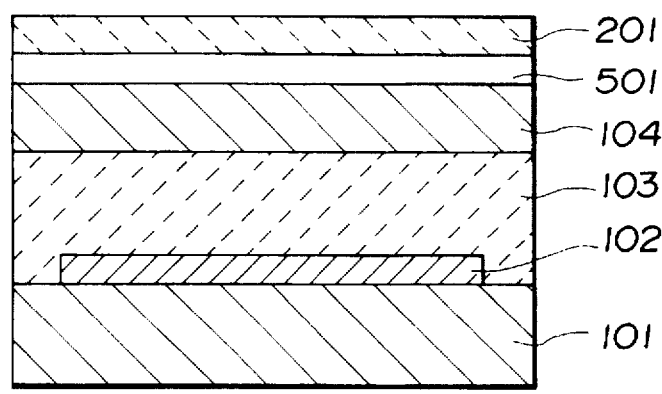
FIG. 8 is a schematic view of a third embodiment of an information recording medium according to the present invention.

An alternative arrangement is shown in FIG. 8 in which an optical card has the barrier layer 501 between the print layer 201 and the protective substrate 104.

Fourth Embodiment

A fourth embodiment of the information recording medium according to the present invention will now be explained with reference to FIG. 9.

Figure 9:
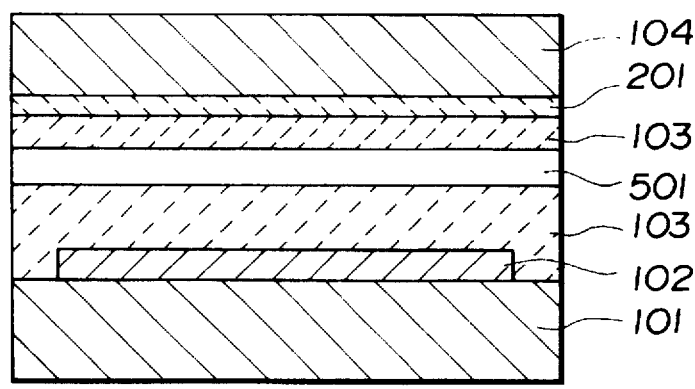
FIG. 9 is a schematic view of a fourth embodiment of an information recording medium according to the present invention.

Referring to FIG. 9, the information recording medium has the same structure as that shown in FIG. 5 except that the print layer 201 is provided on the surface of the protective substrate 104 which opposes the recording layer 102 and substrate 101.

In this embodiment, a laminated structure consisting of the barrier layer 501 and the adhesive layer 103 prevents the recording layer 102 from deteriorating due to the influence of the print layer 201. The permeability of the laminated structure is preferably the same as that of the laminated structure of the optical card shown in FIG. 5.

As the barrier layer 501 in this embodiment, the materials which are described above in relation to the other embodiments of the invention can be used. However, as the laminated structure does not include the protective substrate 104, it is preferable to thicken the barrier layer 501, to be, for example between 60 to 80 μm and/or to use for the adhesive layer 103 a material whose permeability is small, such as silicone rubber type adhesives etc.

Fifth Embodiment

A fifth embodiment of the information recording medium according to the present invention will now be explained with reference to FIG. 10.

Figure 10:
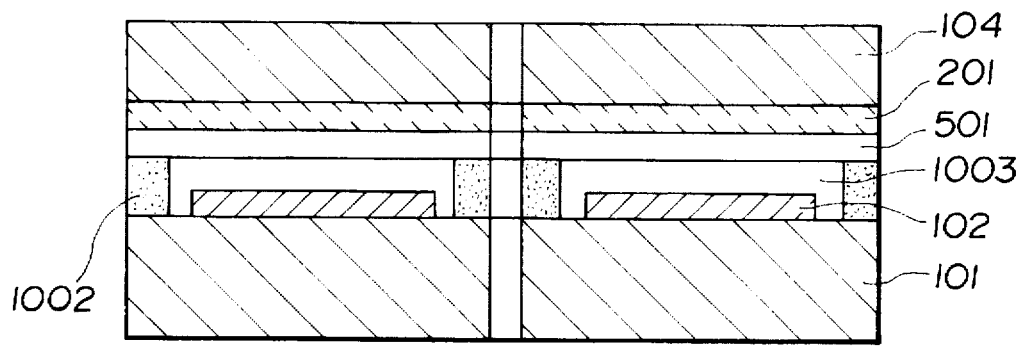
FIG. 10 is a schematic sectional view of an optical recording disk according to a fifth embodiment of an information recording medium according to the present invention.

Referring to FIG. 10 the optical recording disk includes a substrate 101 which carries a recording layer 102, and is bonded to the protective substrate 104 through a spacer 1002 so that an air gap 1003 is provided above the recording layer 102.

In this embodiment, only the barrier layer 501 prevents the recording layer from deteriorating due to the print layer 201, the thickness of the optical disk being thicker than that of the optical card.

So that the barrier layer 501 can be thick, for example a 100 μm resin film, many laminated resin layers may be used as the barrier layer. Examples for such a multi-layered resin film include polyethylene-nylon-polyethylene-urethane acrylate-poly-ethylene.

By use of a medium in accordance with the invention it is possible to obtain an information recording medium having good durability even if a print layer is included. In particular it is possible to obtain an information recording medium comprising a print layer, wherein influence of the print layer to a recording layer can be avoided. Thus, it is possible to provide a print layer on an information recording layer without considering the influence on the recording layer. Information such as visible information can thus be freely added to an information recording medium.

A number of the embodiments of information recording media in accordance with the invention, together with their method of production will now be described in more detail with reference to the following examples.

EXAMPLE 1

The optical card shown in FIG. 5 was prepared using the process illustrated in FIG. 6.

First of all, a substrate 101 having a dimension of 0.25 mm thickness, 54 mm width and 85 mm length was formed from bisphenol A type polycarbonate.

The substrate 101 was provided with tracking grooves (not shown) running parallel to each other and having 3 micron width, 3000 Å depth and 9 micron pitch which will act as a preformat in the card.

Next, diacetonalcohol containing polymethine dye (trade name: IR-820; manufactured by NIHON KAYAKU KK) was applied on the surface of the substrate 101 by a gravure coating method to form a recording layer having a 1000 Å dry thickness.

A transparent bisphenol type polycarbonate substrate having dimensions of 0.25 mm thickness, 54 mm width and 85 mm length was prepared for use as the protective substrate 104.

The substrate 101 provided with the recording layer 102 was then disposed relative to the protective substrate 104 such that the recording layer 102 opposed the protective substrate 104. A 30 μm thickness of hot melt adhesive sheet made of ethylene-acrylic acid copolymer was used as the first adhesive layer 103-1, and a 40 μm thickness of resin film comprising a 10 μm thickness of polyvinylidene chloride and a 30 μm thickness of polyethylene was used as the barrier layer 501. A 30 μm thickness of hot melt adhesive sheet made of ethylene-acrylic acid copolymer was used as the second adhesive layer 103-2. The layers 103-1, 501, 103-2 were disposed in this order between the protective substrate 104 and the recording layer 102.

The protective substrate 104 was then bonded to the substrate 101 using a hot pressing method with a pair of rolls (not shown) so as to heat one of the surfaces of the card at 120° C. and the other surface of the card at 140° C.

Next, ink (trade mark: SERICOL PROTEIN WR-HAS: manufactured by TEIKOKU PRINTING INK Mfg. Co. Ltd.) dissolved and dispersed into mixed solvent of cyclohexanone and isophorone was applied on the first surface of the protective substrate 104 using a screen printing method to form a print layer 201 having a 40 μm dry thickness.

After leaving the optical card at 80° C. under 35% or less humidity for 1 hour to dry the print layer 201, the optical card was set in an apparatus (not shown) for recording and/or reproducing optical data recorded on the optical card. A 830 nm wavelength laser beam from a semiconductor laser was used to irradiate the recording layer 102 through the substrate 101 to measure the initial reflectance of the recording layer 102.

Then, after leaving the optical card at 85° C. for 1000 hours, the reflectance of the recording layer was measured in the same manner as above. The results are shown in Table 1.

Another transparent bisphenol A type polycarbonate substrate having a dimension of 0.25 mm thickness, 54 mm width and 85 mm length was then prepared.

A 30 μm thickness of hot melt adhesive sheet made of ethylene-acrylic acid copolymer was used as the first adhesive layer 103-1, 40 μm thickness of resin film comprising 10 μm thickness of polyvinylidene chloride and 30 μm thickness of polyethylene was used as the barrier layer 501 and 30 μm thickness of hot melt adhesive sheet made of ethylene-acrylic acid copolymer was used as the second adhesive layer 103-2. These layers were then laminated on the polycarbonate substrate 101 to form a laminated structure which corresponds to the structure 103-1, 501, 103-2 between the print layer 201 and the recording layer 102 of the optical card described above.

Next, the permeability of the laminated structure from the substrate side 101 to the second adhesive layer 103-2 side was measured by using a modified so called "Dish method" which is regulated according to Japan Industrial Standard (JIS) 0208, the contents of which are hereby incorporated by reference.

Figure 11:
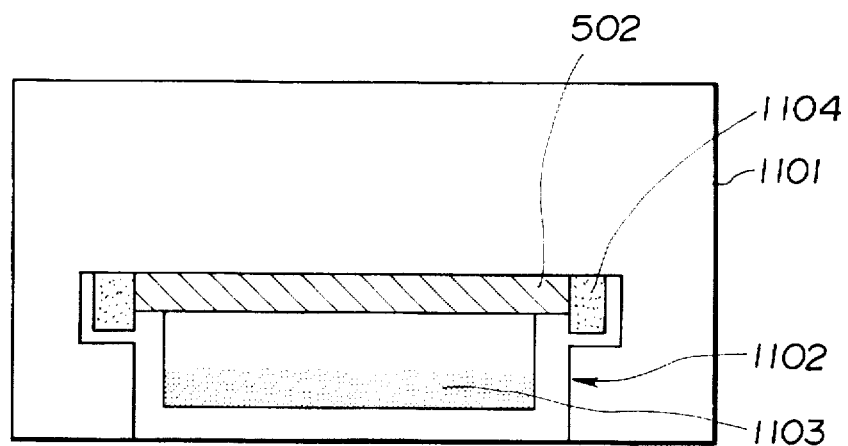
FIG. 11 illustrates a method for measuring the permeability of a solvent.

The modified dish method will now be explained with reference to FIG. 11. Referring to FIG. 11, 1101 is a thermo-regulated tank, the temperature of which is regulated at 40° C. and the humidity of which is regulated at 50%, 1102 is a cup and 1103 is a solvent. The permeability of the laminated layers 502 between the print layer 201 and the recording layer 102 is measured as follows: First of all, a predetermined amount of the solvent 1103 is poured into the cup 1102. The laminated layers 502 are placed on the cup 1102 so as to cover the whole opening of the cup 1102. The periphery of the laminated layers is sealed with sealing wax 1104. The covered cup 1102 is then left for a predetermined time in circulating fresh air which does not contain any solvents, and which is regulated at 40° C. and 50% of humidity. The amount of the solvent remaining is then weighed to measure the amount of the solvent which has evaporated thorough the laminated layers 502.

The measured permeability of the laminated layers 502 is a value relating to the amount of the solvent which has evaporated through the laminated layers 502 per unit area of the laminated layers 502. The results are shown in Table 1.

COMPARATIVE EXAMPLE 1

An optical card was prepared in the same manner as for card of Example 1 except that the barrier layer 501 was omitted. The initial reflectance of the recording layer 102 and the reflectance after leaving the card at 85° C. for 1000 hours were then measured. The results are shown in Table 1.

Next, a laminated structure which corresponded to the structure between the print layer 201 and the recording layer 102 was formed and the permeability was measured in the same manner as in Example 1. The results are shown in Table 1.

EXAMPLE 2

The optical card shown in FIG. 7 was prepared by the following steps.

First of all, a transparent substrate made of polymethylemthaacrylate having dimensions of 0.4 mm thickness, 54 mm width and 85 mm length was prepared for use as the substrate 101. The substrate 101 was provided with tracking grooves (not shown) running parallel to each other and having 3 micron width, 3000 Å depth and 9 micron pitch, these grooves acting as a preformat for the card.

Next, dichloroethane containing cyanine dye (trade name: NK1414: mfd. by NIPPON KANKO SIKISO KK) was applied on the surface of the substrate 101 by a gravure coating method to form a recording layer 102 having a 1000 Å dry thickness.

A transparent polymethyl methacrylate substrate having dimensions of 0.25 mm thickness, 54 mm width and 85 mm length was prepared as the protective substrate 104.

Next, ink (trade name: A-126-50: mfd. by DAINIPPON INK & CHEMICALS INC) dissolved and dispersed into a mixed solvent of butyl acetate and toluene was applied on the first surface of the protective substrate 104 using a screen printing method to form a print layer 201 having a 40 μm dry thickness.

After leaving the protective substrate at 80° C. for 1 hour to dry the print layer 201, the substrate 101 provided with the recording layer 102 was then arranged relative to the protective substrate 104 such that the recording layer 102 opposes the print layer 201. A 30 μm thickness of hot melt adhesive sheet made of ethylene-acrylic acid copolymer was provided as the first adhesive layer 103-1, a 25 μm thickness of resin film comprising 10 μm thickness of polyethylene—5 μm thickness of nylon—10 μm thickness of polyethylene was provided as the barrier layer 501 and a 30 μm thickness of hot melt adhesive sheet made of ethylene-acrylic acid copolymer was provided as the second adhesive layer 103-2. The first adhesive layer 103-1, the barrier layer 501, and the second adhesive layer 103-2 were then arranged in this order between the protective substrate 104 and the recording layer 102.

The protective substrate 104 was then bonded to the substrate 101 using a hot pressing method with a pair of rolls (not shown), in which one of the surfaces of the optical card was heated at 140° C. and the other surface was heated at 120° C.

The optical card so formed was then set in an apparatus (not shown) for recording and/or reproducing signals on/from the optical card, using a 830 nm wavelength laser beam from a semiconductor laser to irradiate the recording layer 102 through the substrate 101 to measure the initial reflectance of the recording layer 102.

After leaving the optical card at 85° C. for 1000 hours, the reflectance of the recording layer 102 was measured in the same manner as above. The results are shown in Table 1.

A laminated structure corresponding to the structure between the print layer 201 and the recording layer 102 of the optical card formed as for Example 2 was then formed, and the permeability was measured as the same manner as in Example 1. The results are shown in Table 1.

COMPARATIVE EXAMPLE 2

An optical card was prepared in the same manner as the optical card of Example 2 except that the barrier layer 501 was omitted. The initial reflectance of the recording layer 102 and the reflectance after leaving the card at 85° C. for 1000 hours were then measured. The results are shown in Table 1.

Next, a laminated structure corresponding to the structure between the print layer 201 and the recording layer 102 of the optical card obtained in the Comparative Example 2 was formed and the permeability was measured as the same manner as in Example 1. The results are shown in Table 1.

EXAMPLE 3

An optical card was prepared in the same manner as the Example 1 except that using 30 μm barrier layer comprising 15 μm urethane acrylate and 15 μm polyethylene instead of the 40 μm thickness of resin film comprising 10 μm thickness of polyvinylidene chloride and 30 μm thickness of polyethylene. The initial reflectance of the recording layer and the reflectance after leaving the card at 85° C. for 1000 hours were measured. The results are shown in Table 1.

EXAMPLE 4

An optical card was prepared in the same manner as the Example 2 except for using 25 μm barrier layer comprising 15 μm thickness polyimide and 10 μm thickness polytetrafluoro resin instead of the 25 μm thickness of resin film comprising 10 μm thickness of polyethylene—5 μm thickness of nylon—10 μm thickness of polyethylene as the barrier layer. The initial reflectance of the recording layer and the reflectance after leaving the card at 85° C. for 1000 hours were measured. The results are shown in Table 1.

In addition, the permeability of the laminated structure between the print layer and the recording layer was measured. The results are also shown in Table 1.

TABLE 1

|  | Reflectivity | | Permeability |
| --- | --- | --- | --- |
|  | Initial | After test | [cm³(STP).cm]/[cm².s.cmHg] |
| EXAMPLE 1 | 15% | 14.3% | $5.3 \times 10^{-13}$ |
| COMPARATIVE EXAMPLE 1 | 15 | 11.9 | $2.0 \times 10^{-11}$ |
| EXAMPLE 2 | 17.2 | 14 | $3.2 \times 10^{-12}$ |
| COMPARATIVE EXAMPLE 2 | 17.2 | 10 or less | $2.0 \times 10^{-11}$ |
| EXAMPLE 3 | 14.9 | 14.4 | $3.9 \times 10^{-13}$ |
| EXAMPLE 4 | 17.3 | 16.5 | $1.3 \times 10^{-13}$ |

(*)After 500 hours

What we claim is:

1. An information recording medium comprising:
   a substrate; and
   a multilayer structure comprising
   a recording layer,
   a protective layer,
   a print layer provided on the protective layer, and
   a barrier layer located intermediate the print layer and the recording layer, wherein total solvent permeability of the layers between the print layer and the recording layer is $5 \times 10^{-12}$ (cm³(STP)·cm/cm²·s·cmHg) or less, and the thickness of the barrier layer is from 0.1 to 200 μm.

2. The information recording medium according to claim 1, wherein the print layer is provided on the surface of the protective layer that is not directed towards the recording layer.

3. The information recording medium according to claim 2, wherein the barrier layer is provided between the protective layer and the recording layer.

4. The information recording medium according to claim 1, wherein the protective layer is provided between the print layer and the recording layer, and wherein the barrier layer is provided between the print layer and the protective layer.

5. The information recording medium according to claim 1, wherein the print layer is provided on a surface of the protective layer which faces towards the recording layer.

6. The information recording medium according to claim 1, wherein the barrier layer is provided on the recording layer with an adhesive layer provided therebetween.

7. The information recording medium according to claim 1, wherein the total solvent permeability is $1 \times 10^{-12}$ (cm³(STP)·cm/cm²·s·cmHg).

8. The information recording medium according to claim 1, wherein the barrier layer comprises at least two sublayers.

9. The information recording medium according to claim 8, wherein at least one of the sublayers comprises a resin selected from the group consisting of photocurable resins, thermosetting resins and thermoplastic resins.

10. The information recording medium according to claim 9, wherein at least one of the sublayers comprises a resin selected from the group consisting of urethane acrylate resins, polyamide resins, polyethylene resins and polyvinylidene chloride resins.

11. The information recording medium according to claim 1, wherein the total thickness of all of the layers between the print layer and the recording layer is 0.4 mm or less.

12. The information recording medium according to claim 11, wherein the total thickness is 0.1 mm or less.

13. The information recording medium according to any one of the preceding claims, wherein the protective layer is made of resin.

14. The information recording medium according to claim 13, wherein the resin is selected from the group consisting of polycarbonate resins, acrylic resins and polyolefin resins.

15. The information recording medium according to claim 1, wherein an adhesive layer is disposed between the protective layer and the recording layer.

16. The information recording medium according to claim 15, wherein the adhesive layer comprises a hot-melt adhesive.

17. The information recording medium according to claim 16, wherein the hot-melt adhesive comprises an adhesive selected from the group consisting of ethylene-vinyl acetate copolymer, ethylene-acrylic acid copolymer, and ethylene-acrylic ester copolymer.

18. An information recording medium comprising:
   a recording layer;
   a protective layer;
   a print layer; and
   a barrier layer located intermediate the print layer and the recording layer, said barrier layer comprising at least two sublayers.

19. An information recording medium comprising, in order:
   a print layer;
   a barrier layer;
   a protective substrate layer;
   a recording layer; and
   a substrate.

20. An information recording medium according to claim 19, wherein total solvent permeability of all layers between the print layer and the recording layer is $5 \times 10^{-12}$ (cm$^3$(STP)·cm/cm$^2$·s·cmHg) or less, and the thickness of the barrier layer is from 0.1 to 200 μm.

21. An information recording medium according to claim 20, wherein the total solvent permeability of the barrier layer and the protective substrate layer is $5 \times 10^{-12}$ (cm$^3$(STP)·cm/cm$^2$·s·cmHg) or less.

22. An information recording medium according to claim 20, wherein the total solvent permeability is $1 \times 10^{-12}$ (cm$^3$(STP)·cm/cm$^2$·s·cmHg) or less.

23. An information recording medium according to claim 22, wherein the total solvent permeability of the barrier layer and the protective substrate layer is $1 \times 10^{-12}$ (cm$^3$(STP) cm/cm$^2$·s·cmHg) or less.

24. An information recording medium according to claim 19, wherein the barrier layer comprises at least two sublayers.

25. An information recording medium according to claim 24, wherein at least one of the sublayers comprises photocurable resin, thermosetting resin, or thermoplastic resin.

26. An information recording medium according to claim 25, wherein at least one of the sublayers comprises a material selected from urethane acrylate, polyamide, nylon, polyethylene, and polyvinylidene chloride.

27. An information recording medium according to claim 19, wherein total thickness of all layers between the print layer and the recording layer is 0.4 mm or less.

28. An information recording medium according to claim 27, wherein the total thickness of the barrier layer and the protective substrate layer is 0.4 mm or less.

29. An information recording medium according to claim 27, wherein the total thickness is 0.1 mm or less.

30. An information recording medium according to claim 29, wherein the total thickness of the barrier layer and the protective substrate layer is 0.1 mm or less.

31. An information recording medium according to claim 19, wherein the protective substrate layer is made of resin.

32. An information recording medium according to claim 31, wherein the resin is one of polycarbonate resin, acrylic resin, and polyolefin type resin.

33. An information recording medium according to claim 19, further comprising an adhesive layer disposed between the protective substrate layer and the recording layer.

34. An information recording medium according to claim 33, wherein the adhesive layer comprises a hot-melt type adhesive.

35. An information recording medium according to claim 34, wherein the hot-melt type adhesive comprises one of ethylene-vinyl acetate copolymer, ethylene-acrylic acid copolymer, and ethylene-acrylic ester copolymer.

36. An information recording medium comprising, in order:
   a protective layer;
   a print layer;
   a barrier layer;
   a recording layer; and
   a substrate.

37. An information recording medium according to claim 36, wherein the print layer is provided on a surface of the protective layer.

38. An information recording medium according to claim 36, further comprising an adhesive layer disposed between the barrier layer and the recording layer.

39. An information recording medium according to claim 36, wherein total solvent permeability of all layers between the print layer and the recording layer is $5 \times 10^{-12}$ (cm$^3$(STP)·cm/cm$^2$·s·cmHg) or less, and the thickness of the barrier layer is from 0.1 to 200 μm.

40. An information recording medium according to claim 39, wherein the total solvent permeability of the barrier layer is $5 \times 10^{-12}$ (cm$^3$(STP)·cm/cm$^2$·s·cmHg) or less.

41. An information recording medium according to claim 39, wherein the total solvent permeability is $1 \times 10^{-12}$ (cm$^3$(STP)·cm/cm$^2$·s·cmHg) or less.

42. An information recording medium according to claim 41, wherein the total solvent permeability of the barrier layer is $1 \times 10^{-12}$ (cm$^3$(STP)·cm/cm$^2$·s·cmHg) or less.

43. An information recording medium according to claim 36, wherein the barrier layer comprises at least two sublayers.

44. An information recording medium according to claim 43, wherein at least one of the sublayers comprises photocurable resin, thermosetting resin, or thermoplastic resin.

45. An information recording medium according to claim 44, wherein at least one of the sublayers comprises a material selected from urethane acrylate, polyamide, nylon, polyethylene, and polyvinylidene chloride.

46. An information recording medium according to claim 36, wherein total thickness of all layers between the print layer and the recording layer is 0.4 mm or less.

47. An information recording medium according to claim 46, wherein the total thickness of the barrier layer is 0.4 mm or less.

48. An information recording medium according to claim 46, wherein the total thickness is 0.1 mm or less.

49. An information recording medium according to claim 48, wherein the total thickness of the barrier layer is 0.1 mm or less.

50. An information recording medium according to claim 36, wherein the protective layer is made of resin.

51. An information recording medium according to claim 50, wherein the resin is one of polycarbonate resin, acrylic resin, and polyolefin type resin.

52. An information recording medium comprising:
   a substrate; and
   a multilayer structure comprising
      a recording layer,
      a protective layer,
      a print layer provided on the protective layer, and
      a barrier layer located intermediate the print layer and the recording layer, wherein the barrier layer comprises at least two sublayers.

53. The information recording medium according to claim 52, wherein the print layer is provided on a surface of the protective layer that is not directed towards the recording layer.

54. The information recording medium according to claim 53, wherein the barrier layer is provided between the protective layer and the recording layer.

55. The information recording medium according to claim 52, wherein the print layer is provided on a surface of the protective layer that is directed towards the recording layer.

56. The information recording medium according to claim 55, wherein the barrier layer is provided between the print layer and the recording layer.

57. The information recording medium according to claim 56, further comprising an adhesive layer provided between the barrier layer and the print layer, and another adhesive layer provided between the barrier layer and the recording layer.

58. The information recording medium according to claim 52, wherein total permeability of the layers between the print layer and the recording layer is $1 \times 10^{-12}$ ($cm^3$(STP)·cm/$cm^2$·s·cmHg) or less, and the thickness of the barrier layer is from 0.1 to 200 μm.

59. The information recording medium according to claim 52, wherein at least one of the sublayers comprises a resin selected from the group consisting of photocurable resin, thermosetting resin, and thermoplastic resin.

60. The information recording medium according to claim 59, wherein at least one of the sublayers comprises a resin selected from the group consisting of urethane acrylate resin, polyamide resin, polyethylene resin, and polyvinylidene chloride resin.

61. The information recording medium according to claim 52, wherein the total thickness of all of the layers between the print layer and the recording layer is 0.4 mm or less.

62. The information recording medium according to claim 61, wherein the total thickness is 0.1 mm or less.

63. The information recording medium according to claim 52, wherein the protective layer is made of resin.

64. The information recording medium according to claim 63, wherein the resin is one of polycarbonate resin, acrylic resin, and polyolefin type resin.

65. The information recording medium according to claim 20, wherein total thickness of all layers between the print layer and the recording layer including the barrier layer is 0.4 mm or less.

66. The information recording medium according to claim 39, wherein total thickness of all layers between the print layer and the recording layer including the barrier layer is 0.4 mm or less.

67. The information recording medium according to claim 58, wherein total thickness of all the layers between the print layer and the recording layer including the barrier layer is 0.4 mm or less.

68. The information recording medium according to claims 18, 19, 36, or 52, wherein the thickness of the barrier layer is 0.1 to 200 μm.

69. The information recording medium according to claim 68, wherein the thickness of the barrier layer is 0.1 to 100 μm.

70. The information recording medium according to claims 1, 20, 39, or 58, wherein the thickness of the barrier layer is 0.1 to 100 μm.

* * * * *

UNITED STATES PATENT AND TRADEMARK OFFICE
CERTIFICATE OF CORRECTION

PATENT NO. : 5,776,575

DATED : July 7, 1998

INVENTOR(S): MIZUHO HIRAOKA, ET AL.

It is certified that error appears in the above-identified patent and that said Letters Patent is hereby corrected as shown below:

On the title page,

Item [30] <u>Foreign Application Priority Data</u>

"6-1100118" should read --6-110118--.

Item [56] FOREIGN PATENT DOCUMENTS

Insert --62-290585  12/1987  Japan-- and
--64-16696  1/1989  Japan--.

COLUMN 1

Line 34, "and 3" should read --and 3,--.
Line 43, "a information" should read --an information--.
Line 61, "example;" should read --example,--.

COLUMN 2

Line 44, "a information" should read --an information--.

COLUMN 4

Line 30, "for the adhesive" should be deleted.

UNITED STATES PATENT AND TRADEMARK OFFICE
CERTIFICATE OF CORRECTION

PATENT NO. : 5,776,575
DATED : July 7, 1998
INVENTOR(S) : MIZUHO HIRAOKA, ET AL.

It is certified that error appears in the above-identified patent and that said Letters Patent is hereby corrected as shown below:

COLUMN 9

```
    Line 38, "as the" should read --in the--.
    Line 51, "as the" should read --in the--.
```

COLUMN 10

```
    Line 29, "comprising" should read --comprising:--.
```

COLUMN 13

```
    Line 13, "comprising" should read --comprising:--.
```

Signed and Sealed this

Twelfth Day of October, 1999

Q. TODD DICKINSON

Attest:

Attesting Officer

Acting Commissioner of Patents and Trademarks